United States Patent [19]
Mochida et al.

[11] Patent Number: 4,884,087
[45] Date of Patent: Nov. 28, 1989

[54] PHOTOGRAPHIC FILM PACKAGE AND METHOD OF MAKING THE SAME

[75] Inventors: Mitsuyoshi Mochida, Tokyo; Tokuo Maekawa, Kanagawa; Hisashi Takei, Kanagawa; Yasuo Matsumoto, Kanagawa; Hiroshi Ohmura, Tokyo; Shigeru Sugimoto, Kanagawa; Seimei Ushiro, Tokyo; Seiji Asano, Saitama; Toshio Yoshida, Ibaragi, all of Japan

[73] Assignee: Fuji Photo Film Co., Ltd., Kanagawa, Japan

[21] Appl. No.: 87,388

[22] Filed: Aug. 20, 1987

[30] Foreign Application Priority Data

Aug. 20, 1986 [JP] Japan ............................. 61-126942[U]
Oct. 17, 1986 [JP] Japan ................................ 61-246977
Oct. 17, 1986 [JP] Japan ................................ 61-246978
Jan. 19, 1987 [JP] Japan ............................... 62-5694[U]
Jan. 19, 1987 [JP] Japan ............................... 62-5698[U]
Feb. 14, 1987 [JP] Japan ................................ 62-32185

[51] Int. Cl.$^4$ ......................... G03B 1/10; G03B 1/66;
G03B 17/02; G03B 17/28
[52] U.S. Cl. ..................................... 354/75; 354/202;
354/212; 354/217; 354/288
[58] Field of Search .................. 354/75, 76, 202, 212, 354/217, 288

[56] References Cited

U.S. PATENT DOCUMENTS

| 2,557,297 | 6/1951 | Lea | 95/31 |
| 2,612,092 | 9/1952 | Heyer et al. | 354/76 |
| 2,933,027 | 4/1960 | Hollingworth et al. | 95/31 |
| 3,247,773 | 4/1966 | Doblin et al. | 95/31 |
| 3,511,153 | 5/1970 | Steisslinger et al. | 354/213 |
| 3,752,050 | 8/1973 | Wolfe | 354/213 |
| 3,896,467 | 7/1975 | Hamada | 354/204 |
| 3,906,535 | 9/1975 | Takahama et al. | 354/288 |
| 4,274,726 | 6/1981 | Yoneyama et al. | 364/212 X |
| 4,397,535 | 8/1983 | Harvey | 354/212 |
| 4,687,311 | 8/1987 | Malloy Desormeaux | 354/217 |
| 4,707,096 | 11/1987 | Lawther | 354/217 X |

FOREIGN PATENT DOCUMENTS

| 1100461 | 2/1961 | Fed. Rep. of Germany . |
| 1975027 | 12/1967 | Fed. Rep. of Germany . |
| 1979883 | 2/1968 | Fed. Rep. of Germany . |
| 1991324 | 3/1968 | Fed. Rep. of Germany . |
| 2026967 | 12/1971 | Fed. Rep. of Germany . |
| 2351891 | 4/1974 | Fed. Rep. of Germany . |
| 2156078 | 1/1975 | Fed. Rep. of Germany . |
| 3716812 | 11/1987 | Fed. Rep. of Germany . |
| 2048752 | 3/1971 | France . |
| 52-43303 | 10/1977 | Japan . |
| 6708486 | 3/1968 | Netherlands . |
| 607242 | 8/1948 | United Kingdom . |
| 1462353 | 1/1977 | United Kingdom . |
| 2138580 | 10/1984 | United Kingdom . |

Primary Examiner—Michael L. Gellner
Attorney, Agent, or Firm—Young & Thompson

[57] ABSTRACT

A lens-fitted photographic film package comprising a light-tight film casing having an exposure opening, a rolled film disposed on one side of the exposure opening in the light-tight casing, a removable light-tight container having a film winding spool therein disposed on the other side of the exposure opening in the light-tight film casing, and an externally operable film winding member for winding the rolled film around said film winding spool of the light-tight film container. The lens-fitted photographic film package is assembled by the steps of winding film withdrawn from a light-tight film container in a roll in a darkroom; loading the rolled film and the light-tight film container in separate respective receiving chambers formed in a main body section of the lens-fitted photographic film package; and fixing a back cover section to the main body section so as to assemble light-tightly the lens-fitted photographic film package.

15 Claims, 14 Drawing Sheets

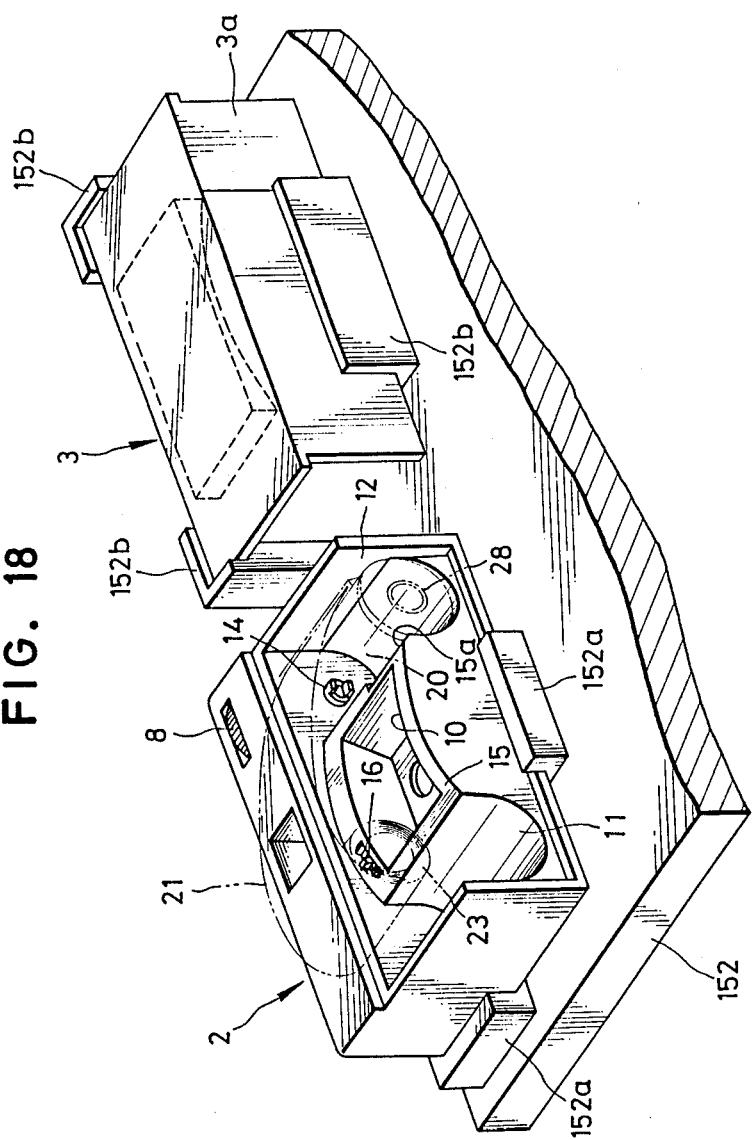

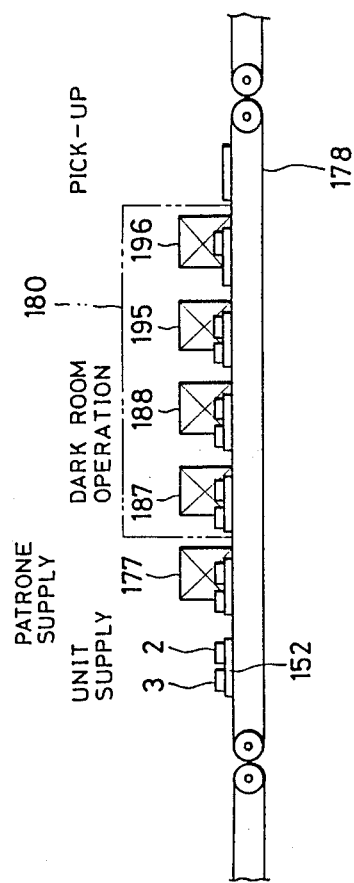
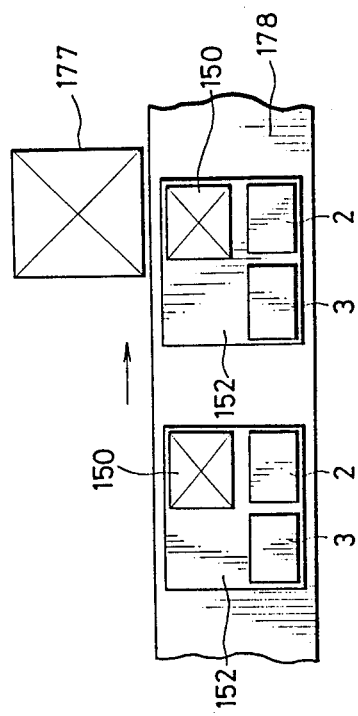

PHOTOGRAPHIC FILM PACKAGE AND METHOD OF MAKING THE SAME

BACKGROUND OF THE INVENTION

The present invention relates to a lens-fitted photographic film package and a method of making the same, and more particularly to a photographic film package in which a photographic film, a taking lens and an exposure member, with their associated elements, are incorporated in a light-tight film casing as a unit, and a method of making the same.

A lens-fitted photographic film package can provide many opportunities for enjoyment by readily taking pictures even when with no camera. This lens-fitted photographic film package comprises a film casing fitted with a taking lens, a simple exposure mechanism which includes a film winding mechanism and a shutter mechanism with their associated elements incorporated in the film casing, and a 110-size cartridge film previously packaged in the film casing, which can be sold wherever photographic film is sold. The lens-fitted photographic film, after the exposure of all frames of the film, is forwarded to a photo shop or photo laboratory without removing the film. There, the film package is opened and the exposed film is developed to make prints therefrom while the film package without the film is scrapped. The prints, together with the developed film, are returned to the customer. Such a lens-fitted single-use film package makes it easy to take pictures because there is no need for film loading and unloading.

As is well known in the art, the 110-size film cartridge has a roll of 110-size film strip contained light-tightly therein. The film package can be assembled by fitting the film cartridge to an exposure chamber formed inside the lens-fitted film casing. Due to the incorporation of cartridge film, not only the assembly of the film package but also the removal of the film cartridge from the film package can take place in daylight without fogging the film in the cartridge.

However, it is hard to make an enlarged print with a favorable image quality from the 110-size film. For better image quality, it has been proposed to provide a lens-fitted film package including a 135-size roll film whose image size is 36×24 mm. By incorporating the 135-size roll film contained in a film patrone defined by the International Organization for Standardization (ISO code 1007: 1979 edition) in such a lens-fitted film package, the existing film processing systems can be utilized in their entireties for the lens-fitted film packages.

Such a 135-size lens-fitted film package is, however, quite hard to be manufactured in a practical form because the film patrone has a single film chamber, in contrast to the 110-size film cartridge which has double film chambers.

A serious problem attending such a lens-fitted film package containing a 135-size film in a patrone is that the exposed film will have to be removed from the lens-fitted film package in a dark room because the film is withdrawn from the patrone one frame every exposure and, after the exposure of all frames of the film, completely withdrawn from the patrone. As is well known, such a dark room film handing is quite troublesome when a large number of films is to be processed at once.

If the film package is adapted to rewind the fully exposed film, and the fully withdrawn film is rewound into the patrone, the film can be removed from the film package in daylight. However, rewinding the exposed film into the patrone requires the provision of a film rewinding mechanism which is attended with an increase in manufacturing cost. Moreover, it is necessary in the photo laboratory to rewind the exposed film before removing it from the film package. In view of such film handling, the film package containing the 135-size film, although possible to be handled in a daylight room, decreases handling efficiency.

OBJECTS OF THE INVENTION

It is, therefore, an object of the present invention to provide a lens-fitted film package which makes it possible to remove easily an exposed film in daylight.

It is another object of the present invention to provide a method of assembling a lens-fitted film package which makes it possible to remove an exposed film in daylight.

SUMMARY OF THE INVENTION

To accomplish the above and other objects, the lens-fitted film package according to the present invention comprises a light-tight film casing having an exposure opening, a rolled film disposed on one side of the exposure opening in the light-tight casing, a removable light-tight film container having a film winding spool therein disposed on the other side of the exposure opening in said light-tight film casing, and an externally operable film winding member for winding the rolled film around the film spool of the light-tight film container.

According to a feature of the present invention, the film of the lens-fitted film package is wound around the film spool in the light-tight film container by one frame after every exposure. When the exposure of all frames of the film has been completed, the film is fully contained in the light-tight film container. Therefore, the film can be removed from the film package in daylight. Usually, the container is removed by breaking the light-tight casing in a photo shop or a photo laboratory.

According to a preferred embodiment of the lens-fitted photographic film package according to the present invention, a 35-mm size film patrone already commercially available is preferably used for the light-tight film container. Because the exposed film can be fully contained in the film patrone without any special winding or rewinding operation, the film with all frames exposed can be handled in the same manner as a conventional film patrone. Therefore, although the lens-fitted photographic film package of this invention is based on a new concept and provides a great convenience to the customers, the existing film handling and processing equipment can be used without any change or modifications.

The lens-fitted photographic film package according to the present invention is assembled by the steps of winding a film withdrawn from a light-tight film container in a roll in a dark room; loading the rolled film and the light-tight film container in respective receiving chambers formed in a main body section of the lens-fitted photographic film package; fitting a back cover section to the main body section so as to close light-tightly the lens-fitted photographic film package; and sealing the lens-fitted photographic film package so that it cannot be inadvertently opened.

BRIEF DESCRIPTION OF THE DRAWINGS

The above and other objects and features of the present invention will become apparent from the following detailed description taken in conjunction with the preferred embodiments thereof with reference to the accompanying drawings in which like parts are designated by like numerals throughout the views of the drawings and wherein:

FIG. 18 is a perspective illustration showing a base plate on which the film loading device of FIG. 15 and a semi-assembly of the lens-fitted photographic film package of FIG. 1 are placed;

FIG. 19 is a schematic illustration showing an automatic assembly line for lens-fitted photographic film packages according to the invention;

FIG. 20 is a plan view showing a part of the automatic assembly line of FIG. 19;

DETAILED DESCRIPTION OF THE INVENTION

Figure 1:
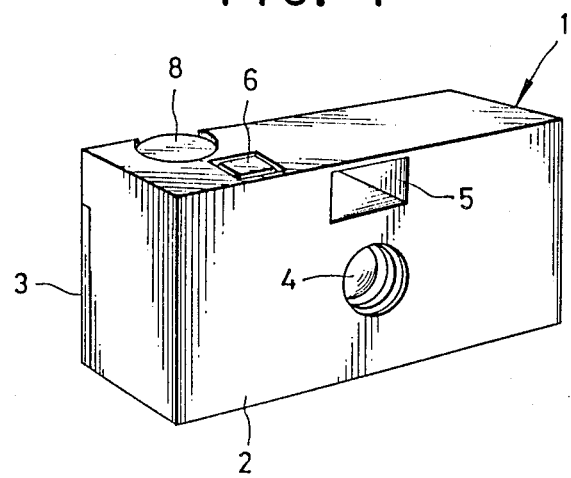
FIG. 1 is a front perspective view of the lens-fitted photographic film package of one embodiment of the present invention.

Referring now to FIG. 1, shown therein is a lens-fitted photographic film package (which is hereinafter referred to as a film package for simplicity) of a first preferred embodiment of the present invention. The film package 1 comprises a main front body section 2 and a back cover section 3 which forms a light-tight box-shaped film container. The main front body section 2 is provided with a taking lens 4, a finder window 5, and a shutter actuating member 6 in its outer walls, and necessary photographic mechanisms such as a shutter mechanism, a film advancing mechanism, and the like incorporated therein. The back cover section 3 is fixed to the main front body section 2 in any well known manner, for example by means of ultrasonic welding, so as not to be removed by the user. The film package is preferably encased tightly in an outer casing or packaging (not shown) which is formed with several openings for exposing the taking lens 4, finder window 5, and shutter actuating member 6.

Figure 3:
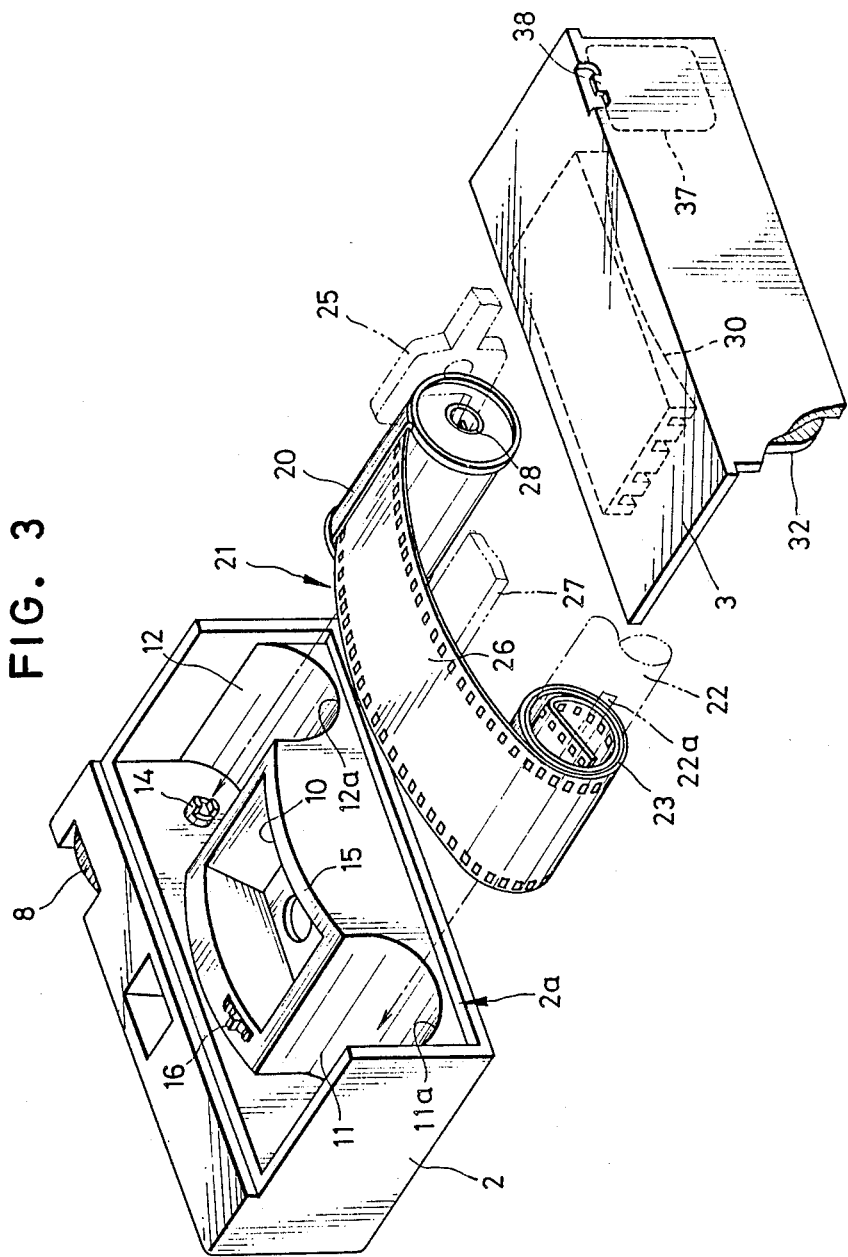
FIG. 3 is an exploded perspective rear view of the lens-fitted photographic film package of FIG. 1.

In FIG. 3 showing the film package disassembled into two sections, the main front body section 2 has an opening 2a extending between its back and bottom. The back cover section 3 is shaped to complimentarily close the opening 2a of the main front body section 2 so as to provide the light-tight box-shaped film container. Inside the main front body section 2, there are a film roll receiving chamber 11 and a film patrone receiving chamber 12 disposed on opposite sides of an exposure frame 10. Projecting from the top wall of the film patrone receiving chamber 12 is a fork 14 which is rotatable by an external film advancing knob 8 in the counterclockwise direction as viewed in FIG. 3. The exposure frame 10 is formed with film guiding and supporting tracks 15 on both sides thereof. In one of the tracks 15, there is a sprocket wheel 16 partially projecting out of the surface.

When assembling the film package 1, a roll 23 of 135-size film 21, and a film patrone 20 in which the film 21 is held at its end by a spool 28 in the film patrone 20, are put in the receiving chambers 11, 12, respectively, prior to fixing together the two sections 2 and 3. This film 21 is of the type having 35mm image frames, which is defined as 135 film by ISO.

The above-described film loading operation is, in this embodiment, performed by the aid of a film loading jig which is shown by double dotted lines in FIG. 3. In greater detail, the unexposed film 21 is withdrawn from the film patrone 20 by and is wound around a cylindrical spool member 22 of the loading jig as a film roll 23 in many convolutions. At the same time, the film patrone 20 is held by a gripping arm 25 of the loading jig and that part of the film extending between the film roll 23 and the film patrone 20 is supported by a plate member 27 of the loading jig in such a way as to be slightly lifted into a curve.

The film patrone 20 and the film 21 held by the loading jig can be inserted into the respective receiving chambers 11 and 12 through respective bottom openings 11a and 12a by moving the loading jig toward the main front body section 2 until the top of the spool 28 (see FIG. 2) of the film patrone 20 is brought into engagement with the fork 14. During this film loading operation, since the part 26 of film 21 is lifted, the perforations in the edge of the film 21 will not be caught by the teeth of the sprocket wheel 16.

After having loaded the film roll 23 and the film patrone 20 in the above-described manner, the gripping arm 25 unclamps the patrone 20 and the cylindrical spool member 22 is resiliently deformed to remove the film 21. The deformation of the cylindrical spool member 22 is allowed due to the provision of a slit 22a therein which receives one end of the film 21. Then the loading jig is returned while the film roll 23 and the film patrone 20 remain in the respective receiving chambers 11 and 12. Although the rolled film 23 is liable to loosen due to its own curling effect, the outermost convolution of the rolled film 23 is restricted by a curved wall of the film roll receiving chamber 11 to prevent the film roll 23 from loosening excessively. Then the back cover section 3 is welded to the main front body section 2.

Inside the back cover section 3, there is a back-up portion 30 shaped complimentarily to the shape of the guide tracks 15 of the exposure frame 10 for pressing the film against the tracks 15 so as to place it in the focal plane of the taking lens 4. There is also a raised portion 32 formed on the bottom of the back cover section 3 which closes the opening 11a of the film roll receiving chamber 11 and supports the lower edges of the convolutions of the rolled film 23. For economy, it is preferable to use a plastic single lens for the taking lens 4. Although a plastic single lens produces some distortion, the curved form of the tracks 15 helps reduce this distortion.

Film loading and film package assembly has to be done in the dark room. The film package of this embodiment can be assembled automatically with the aid of a manipulator in cooperation with the above-described loading jig, even in a dark room, because of the structural simplicity thereof. Therefore, the film package can be assembled at low cost.

Alternatively, the film patrone 20 and the film roll 23 may be loaded in such a way as to wind the film 21 around the cylindrical spool member 22 of the loading jig after the loading of the film patrone in the patrone-receiving chamber 12. In this case, the film is wound while raised at an angle between 30° and 45° with respect to the film roll receiving chamber 11. After the film 21 is fully wound around the cylindrical spool member 22, the rolled film 23 is placed in the film roll receiving chamber 11 and then the cylindrical spool member 22 is removed.

In using the film package thus assembled, when the shutter actuating member 6 is operated, a shutter 35 is opened and closed so as to expose a frame of the film 21 placed over the exposure frame 10. After the exposure, the film advancing knob 8 is operated to rotate the fork 14, thereby rotating the spool 28 of the patrone 20 so as to wind the film by one frame, namely to draw the exposed part of the film into the patrone 20. At the same time, a new frame of the film 21 is advanced to the exposure frame 10 while rotating the sprocket 16. When the sprocket 16 makes a predetermined number of revolutions, the film advancing knob 8 and the shutter 35 with its associated elements are self-cocked so as to set the film package for the next exposure.

As the exposure is repeated in the same manner as described above, the film 21 is progressively drawn into the patrone 20. After the exposure of all frames of the film 21, the film package is forwarded to a photo-shop without removing the exposed film. There, the back cover section 3 is detached from the main front body 2 by the aid of, for example, an expanding jig so as to remove the patrone containing the exposed film 21. The patrone 20 is handled in the same manner as is conventional for removing the exposed film and subjecting it to the necessary processing for development and printing.

It is desirable to provide a tab 38 which can be pulled to tear along a groove 37 by which an openable part of the bottom of the back cover 3 is defined. When the part defined by the groove 37 is torn off, an opening is provided through which the patrone 20 can be removed without detaching the back cover section 3 from the main front body section 2. Thus forming an opening in the film package makes it impossible to reuse the film package. Therefore, it will be impossible to refill a new film into the used film package container in order to reclaim a film package for reuse.

Figure 4:
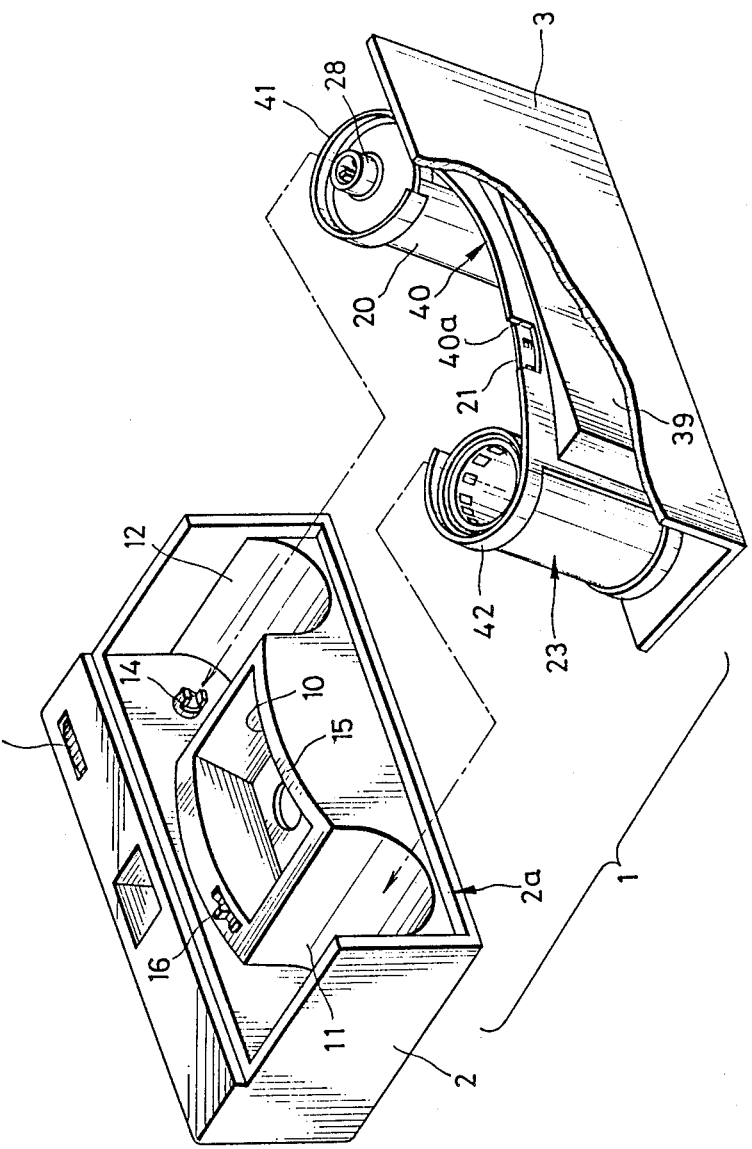
FIG. 4 is an exploded perspective rear view of the lens-fitted photographic film package of a second embodiment of the present invention in which a film roll and a light-tight film container are supported by a back cover section of the lens-fitted photographic film package.
Figure 5:
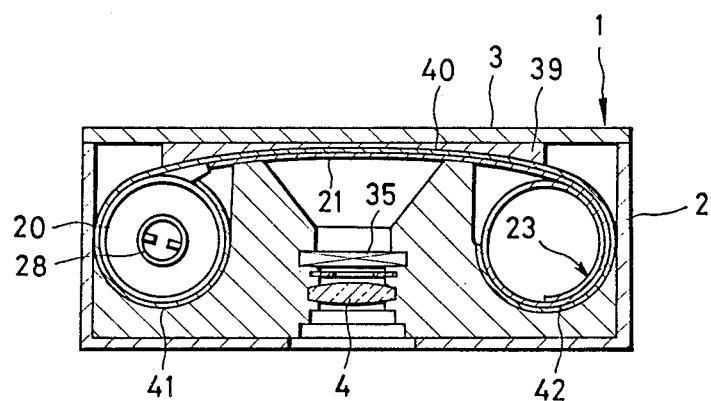
FIG. 5 is a cross sectional view, similar to FIG. 2, of the lens-fitted photographic film package of FIG. 4.

FIGS. 4 and 5 show another embodiment of the lens-fitted film package according to the present invention. In this embodiment, the film patrone 20 and the film roll 23 are supported by the back cover section 3 before assembling the film package 1. For supporting the film patrone 20 and the film roll 23, a resiliently deformable retaining member 40 which is preferably made of a leaf spring is attached to the raised portion 39 of the back cover section 2. The retaining member 40 is curved correspondingly to the curved surface of the exposure frame 15 and has upper and lower retaining arms 41 and 42 which extend laterally and are substantially semicircularly rounded. These arms 41 and 42 are resiliently bendable to hold the film patrone 20 and the film roll 23, respectively. The curved section of the retaining member 40 is partially cut away at 40a for a purpose that will be explained.

When assembling the lens-fitted film package of this embodiment, at first the film is withdrawn from the film patrone 20 while winding the film in a roll 23. Then the patrone 20 and the film roll 23 are fitted in and retained by the rounded end portions 41 and 42 of the retaining member 40. Since the film roll 23 tends to loosen, the outermost convolution of the film roll 23 is brought into light contact with the inner surface of the rounded end portion 42 of the retaining member 40. The cut-away portion 42a allows the teeth of the sprocket wheel 16 to enter the perforations of the film 21.

After the completion of the insertion of the film patrone 20 and the film roll 23, the back cover section 3 is fixed to the main front body section 2 of the film package 1 in the same manner as in the previous embodiment.

As is seen clearly in FIG. 4, because the film roll 23 is held only at its top and bottom by the retaining arms 42, the friction force exerted on the outermost convolution of the film roller 23 is small. Due to the small friction force, the film can be smoothly withdrawn from the film roll receiving chamber 11.

Figure 6:
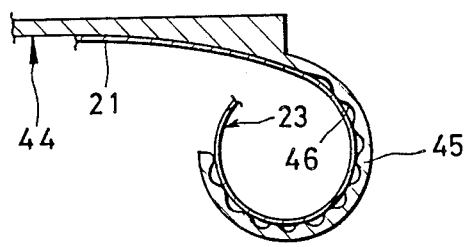
FIG. 6 is a fragmentary cross-sectional illustration of a film supporting member of the lens-fitted photographic film package of FIG. 4.
Figure 7:
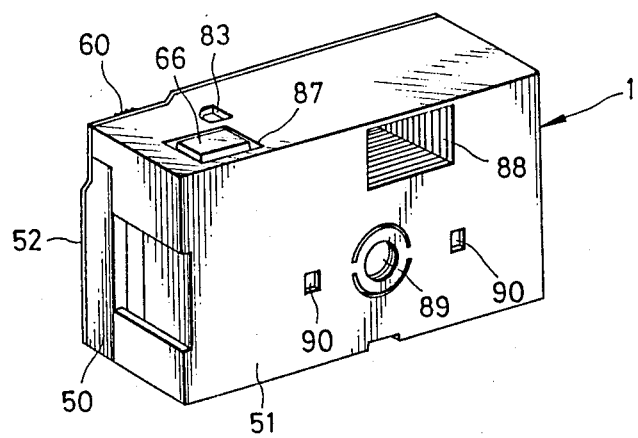
FIG. 7 is a front perspective view of the lens-fitted photographic film package of a third embodiment of the present invention.

As is shown in FIG. 6, it is permissible to form film roll retaining arm member 45 integral with the raised portion 39 in place of the resiliently deformable member 40. In this case, it is preferable to form grooves 46 in the inner surface of the retaining member 45 in order to reduce the friction between the outermost convolution of the film roll 23 and the inner surface of the retaining member 45. The provision of the retaining member for holding the film patrone and the film roll on the back cover section makes it quite easy to assemble the film package in an automatic assembly line.

The lens-fitted film package thus assembled is used in the same manner as that of the previous embodiment.

Reference is now had to FIGS. 7 to 10 showing another preferred embodiment of the lens-fitted film package. The lens-fitted film package 1 comprises a main body section 50, a back cover section 52, and a front cover section 51 which are all made of plastic materials. These sections are assembled into a light-tight box-shaped film container. As will be described in detail later, these sections are fixedly assembled after having loaded the film patrone 20 and a film 21 into the main body section 50. Therefore, the film patrone 20 and the film 21 can by no means be removed by the user.

Figure 8:
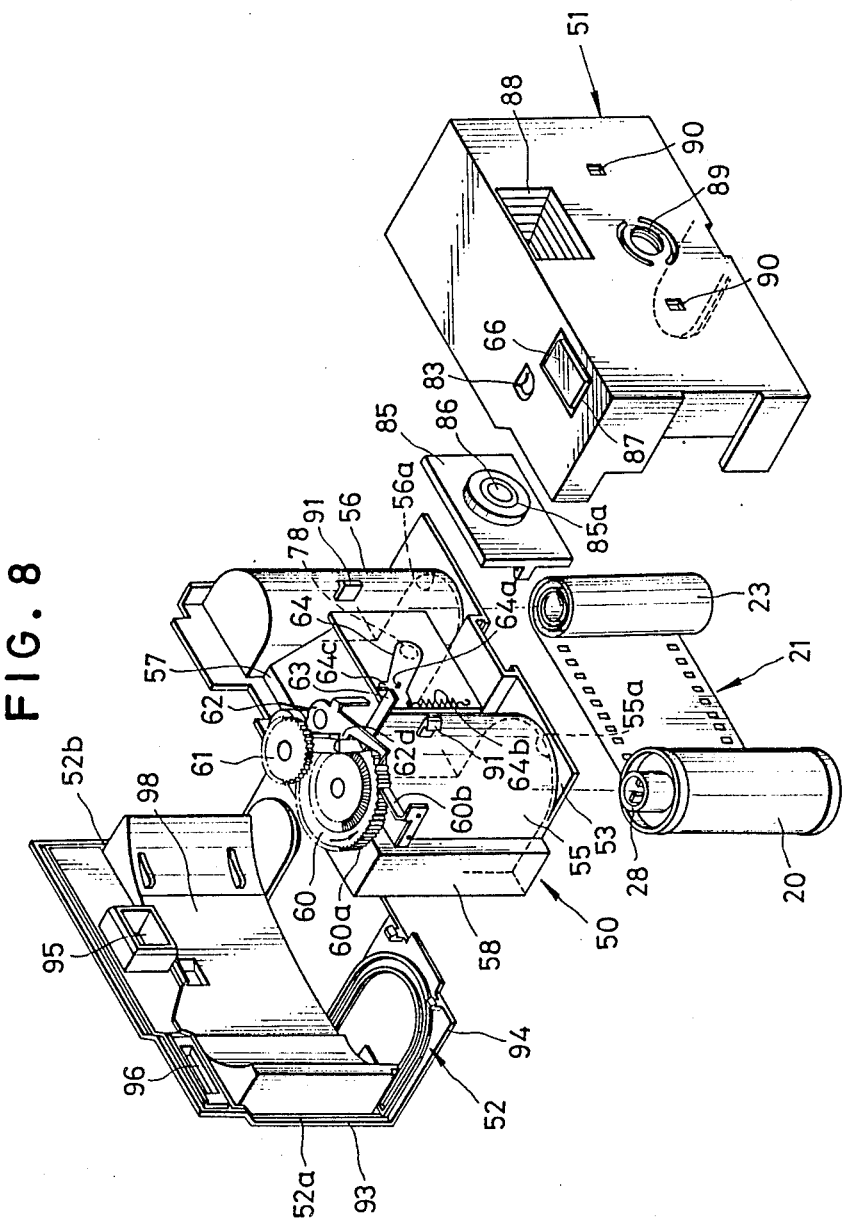
FIG. 8 is an exploded front perspective view of the lens-fitted photographic film package of FIG. 7.

As is shown in FIG. 8, on a base plate 53 of the main body section 50, there are formed a patrone-receiving chamber 55 and a film roll receiving chamber 56 spaced apart a predetermined distance from each other. Each chamber 55, 56 is open at its bottom through an opening 55a, 56a through which the patrone 20 or the film 21 is inserted therein. Upon loading film, the film 21 is withdrawn from the film patrone 20 which is well known to those skilled in the art and already commercially available, and the withdrawn part of the film is wound in a film roll 23. Then the film patrone 20 and the film roll 23 are loaded in the main body section 50 through the openings 55a and 56a. This loading operation is done in a dark room. It is to be noted that the film 21 may be withdrawn from the film patrone before or after the loading of the film patrone 20 into the main body section 50.

Between the film patrone receiving and film roll receiving chambers 55 and 56, there is a connecting section 57 in which an exposure frame is formed. All three sections 55, 56 and 57 are made as one body in a generally rectangular frame 58. At the bottom of the frame 58, there are formed openings in alignment with the openings 55a and 56a of the film patrone and film roll receiving chambers 55 and 56. At the top of the film patrone receiving chamber 55, there is a fork (which is hidden in FIG. 8) similar to the fork 14 of FIG. 3, engageable with the spool 28 of the film patrone 20. When the film advancing knob 60, to which the fork is secured, is rotated in a direction shown by an arrow in FIG. 8, the fork rotates the spool 28 of the patrone 20 so as to retract the film 21 into the film patrone 20. The periphery of the film advancing knob 60 is provided with teeth 60a which are engaged by a resiliently deformable pawl 60b so as to prevent knob 60 from rotating in the clockwise direction.

In the main body section 50, there are also provided an exposure counter 61, a ratchet 62, shutter actuating lever 63, shutter blades 64, driving sprocket 65, and their associated elements by which a shutter mechanism is comprised.

Figure 9:
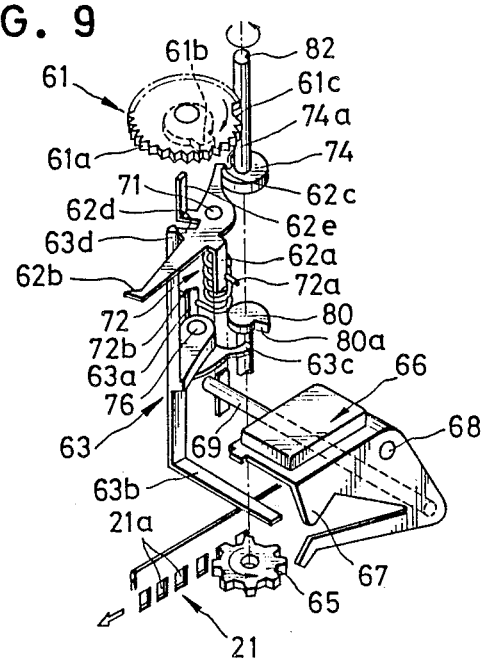
FIG. 9 is a schematic perspective view of a shutter mechanism incorporated in the lens-fitted photographic film package of FIG. 7.
Figure 10:
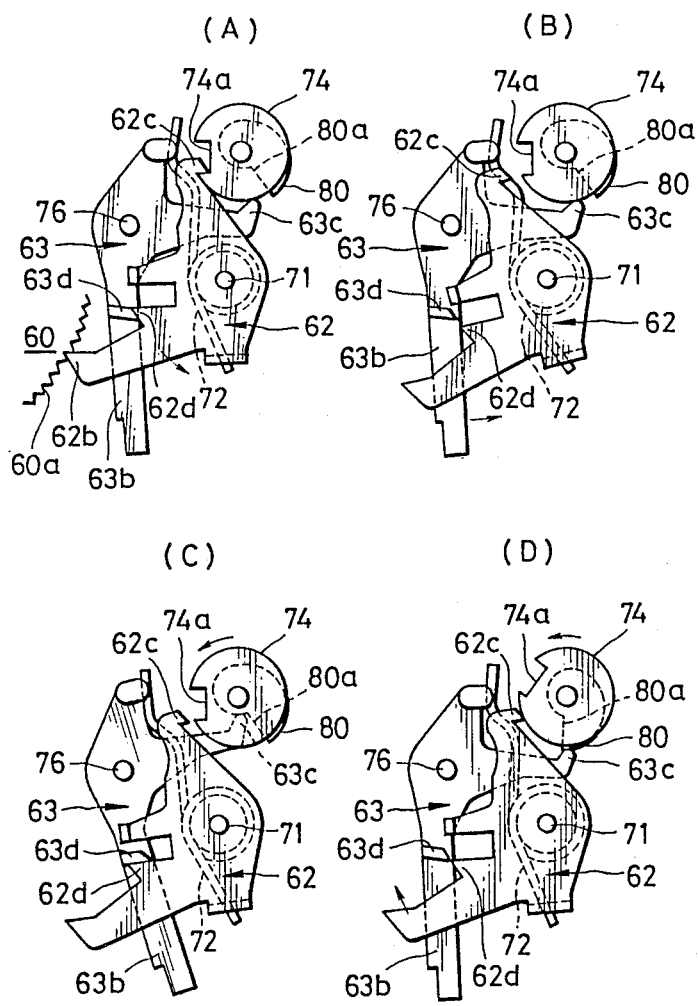
FIGS. 10(A) to (D), are explanatory views showing the operation of the shutter mechanism of FIG. 9.

Referring to FIG. 9 showing the shutter mechanism, a shutter actuating member 66 is formed integrally with a supporting plate 67 which is pivotally mounted on the front cover section 51 by a pivot 68 for pivotal movement. An operating rod 69 is fixed to supporting plate 67 and extends rearwardly. The ratchet 62 is supported by the main body section 50 for pivotal movement and has a bent arm 62a to which a coil spring 72 is attached. By the spring 72, the ratchet 62 is forced in the clockwise direction as seen in FIGS. 9 and 10. The bent arm 62a of the ratchet 62 at its lower end is engaged by the operating rod 69 of the plate 67 integral with the shutter actuating member 66. When the shutter actuating member 66 is depressed, the ratchet 62 is rotated in the counterclockwise direction by the operating rod 69 against the action of spring 72. The ratchet 62 has a hook 62b at the end of its arm which engages the teeth 60a of the film advancing knob 60 so as to prevent the film advancing knob 60 from being rotated.

The film 21 is provided with perforations 21a, eight for each frame. The perforations 21a are engaged by one or two of eight teeth of a driven sprocket wheel 65. Therefore, when the film 21 is advanced by one frame, the sprocket wheel 65 is driven to turn fully once. Coaxially with the driven sprocket 65, there is provided a cam member 74 having a notch 74a on its outer periphery. The periphery of the cam member 74 is contacted by the hooked end 62c of one arm of the ratchet 62. The cam member 74 is caused to rotate in the counterclockwise direction with the driven sprocket wheel 65 when the film 71 is advanced in a direction shown by an arrow in FIG. 9.

A shutter actuating lever 63 is supported for pivotal movement by the main body section 50 by means of a pivot 76. This shutter actuating lever 63 is formed with a bent portion 63a to which one end 72b of spring 72 is connected. Due to the provision of the coil spring 72, the shutter actuating lever 63 is urged to rotate in the counterclockwise direction. As is shown in FIG. 8, the shutter actuating lever 63, and more particularly an arm 63d thereon (FIG. 9), contacts a projection 62d on the ratchet lever 62 to be maintained in the position shown in FIG. 10(A) against the action of coil spring 72. The shutter actuating lever 63 is also formed with an L-shaped bent portion 63b which extends forward to contact the shutter blade 64 as shown in FIG. 8.

The shutter blade 64 is supported by the main body section 50 for pivotal movement but is urged by a spring 64b toward its rest position shown in FIG. 8. When the shutter blade 64 is in this rest position, the shutter blade 64 closes an exposure aperture 78 so as to block light. When the projection 62d of the ratchet lever 62 releases the shutter actuating lever 63 as is shown in FIG. 10(B), the shutter actuating lever 63 is caused to turn in the counterclockwise direction by the force of the spring 72, so as to hit the projection 64c of the shutter blade 64. Consequently, the shutter blade 64 turns in the clockwise direction to open the exposure aperture 78 while charging the spring 64b. When the L-shaped bent portion 63b of the shutter actuating lever 63 rides over the projection 64c of the shutter blade 64, the shutter blade 64 returns to its rest position by the force of the spring 64b to close the exposure aperture 78.

The driven sprocket wheel 65 is provided coaxially integrally with a cam member 80 (FIG. 9) for setting the shutter mechanism. At the completion of the opening and closing of the shutter blade 64, the projection 63c of the shutter actuating lever 63 falls into a recess 80a of the cam member 80. Because the cam member 80 is integral with the driven sprocket wheel 65, the cam member 80 turns in the counterclockwise direction as seen in FIG. 9 as a result of the advance of the film 21. This turning of the cam member 80 causes the shutter actuating lever 63 to turn also in the counterclockwise direction and so to return to its initial position.

The driven sprocket wheel 65 is further provided coaxially with a member 82 having a single notch, which is engaged by any one of teeth 61a of the exposure counter 61. Therefore, when the driven sprocket wheel 65 makes one complete revolution, the single-notched member 82 rotates one complete revolution, turning the exposure counter by one tooth. Correspondingly to the angular positions of the teeth 61a of the exposure counter 61, there are provided numerals on counter 61 (FIG. 11) to indicate the number of exposed or unexposed frames. The marks, such as numerals, are viewed through a window 83 formed in the front cover section 51.

As is shown in FIG. 8, in front of the shutter blade 64, there is a lens supporting board 85 in which an opening 85a is formed to hold a plastic lens 86 as the taking lens. The lens supporting board 85 is so placed as to align the plastic lens 86 with the exposure aperture 78.

In the top wall of the front cover section 51 is a square opening 87 which receives therein the shutter actuating member 66 with its top surface flush with, or even below, the outer surface of the top wall of the front cover section 51. In the front wall of the front cover section 51, there are a tunnel-like viewfinder 88, a circular opening 89, and small square openings 90. The opening 89 is formed coaxially with the optical axis of the lens 86. The small openings 90 are located correspondingly to fixing lugs 91 projecting from the main body section 50 by which the two sections 50 and 51 are temporarily fixed together.

The back cover section 52 (FIG. 8) comprises a back wall 93 and a bottom wall and has a substantially L-shaped cross section. In the back wall 93 is an opening 95 in alignment with the tunnel-like viewfinder 88 through which an object is viewed. There is also formed a rectangular opening 96 in the back wall 63 which receives therein the film advancing knob 60 with its outer periphery flush with, or even below, the outer surface of the back wall 93 of the back cover section 52. Inside the back wall 93 of the back cover section 52 is a raised portion 98 having a curved surface for supporting the film 21 thereon and guiding it therealong.

The back cover section is fitted to the main body section 50 in such a way as to position the bottom plate 94 under the base plate 53 of the main body section 50 so as to cover the openings 55a and 56a of the film patrone and film roll receiving chambers 55 and 56. Due to the construction of the film package 1, by fixing the back cover 52 to the main body portion 50 in which the film patrone 20 and the film roll 23 have been previously loaded, the film 21 is contained light-tightly. Thereafter, the fixing of the front cover section 51 is effected, even in daylight, by welding side edges 52a and 52b of the back cover section to a corresponding recessed portion of the front cover section 51.

The lens-fitted film package 1 is operated by depressing the shutter actuating member 66. Upon the depression of the shutter actuating member 66 from its initial position shown in FIG. 10(A), the ratchet lever 62 is caused by the operating rod 69 to turn in the counterclockwise direction. As is shown in FIG. 10(B), the turning of the ratchet lever 62 releases and allows the shutter actuating lever 63 to turn in the counterclockwise direction under the force of the spring 72. As a consequence, the shutter blade 64 is opened and closed so as to expose the frame of the film 21 positioned in the exposure frame.

At the completion of the opening and closing of the shutter blade 64, the hooked end 62c of the ratchet lever 62 leaves the recess 74a of the cam member 74. As a result, the projection 63d of the shutter actuating lever 63 engages the projection 62d of the ratchet lever 62 to maintain the ratchet lever in the engaged position shown in FIG. 10(C). On the other hand, the hook 62b of the ratchet lever 62 escapes from the tooth 60a of the film advancing knob 60 so as to allow it to be rotated in order to advance the film 21 by one frame.

When rotating the film advancing knob 60 in the clockwise direction as viewed in FIG. 9 after each exposure of the film 21, the fork secured to the film advancing knob 60 rotates the spool 28 of the film patrone 20 to take up the film 21 in the film patrone 20. Due to the film advance, the driven sprocket wheel 65 is turned fully once in the counterclockwise direction so as to rotate the cam members 74 and 80, and the single-notched member 82. The cam member 80 moves the hooked end 63c of the shutter actuating lever 63 so as to rotate the shutter actuating lever 63 in the clockwise direction, thereby disengaging the projection 63d of the shutter actuating lever 63 from the projection 62d of the ratchet lever 62 so as to allow the ratchet lever 62 to rotate in the clockwise direction under the force of spring 72 as is shown in FIG. 10(D). Then the projection 62d of the ratchet lever 62 will be engaged by the projection 63d of the shutter actuating lever 63 from the right hand side of the projection 63d as viewed in FIG. 10. On the other hand, the hooked end 62c of the ratchet lever 62 is brought into contact with the outer periphery of the cam member 74.

Upon the driven sprocket wheel 65 turning fully once, the hooked end 62c of the ratchet lever 62 falls into the recess 74a of the cam member 74, and the ratchet lever 62 further turns slightly in the clockwise direction. As a result, the hook 62b of the ratchet lever 62 is brought into engagement with the tooth 60a of the film advancing knob 60 so as to prevent the film advancing knob 60 and the driven sprocket wheel 65 from further rotating while the cam member 74 is prevented form rotating. In this way, the one-frame film advance is completed; and the shutter actuating lever 63 is returned to its initial position shown in FIG. 10(A) wherein the shutter actuating lever 63 is engaged by the projection 62d of the ratchet lever 62 to be prevented from further rotation in the counterclockwise direction. At this time, the single-notched member 82 moves the exposure counter 61 to change the indicated number by one.

On the under surface of the exposure counter 61 is a cam member 61b (shown in FIG. 9) formed integrally therewith. This cam member 61b is brought into engagement with an upwardly bent end portion 62e of the ratchet lever 62 to rotate the ratchet lever 62 in the counterclockwise direction. Simultaneously, a recess 61a formed in the outer periphery of the exposure counter 61 is moved to a position wherein the notch of the single-notched member 82 is engageable with the teeth of the exposure counter 61. When the ratchet lever 62 is turned counterclockwise, the hooked end 62c of the ratchet lever 62 is disengaged from the peripheral recess 74a of the cam member 74 to allow the driven sprocket wheel 65 to rotate. In this state, as the single-notched member enters the recess 61c of the exposure counter wheel 61, the exposure counter wheel 61 is not rotated even though the sprocket wheel 65 is rotated. Therefore, the film advancing know can be rotated without any interruption to wind the film 21 into the film patrone 20. As described above, the film 21 is completely wound in the film patrone 20 after the exposure of all frames of the film 21, and the unloading of the film patrone 20 containing the exposed film is done quite easily in a photo shop.

Figure 11:
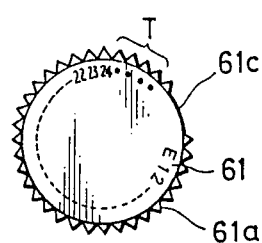
FIG. 11 is a plan view of an alternative form of the frame counter used in cooperation with the shutter mechanism of FIG. 9.

The exposure counter 61 has another indication shown at T in FIG. 11. This indication comprises several dots the number of which corresponds to a number, for example two or three, of possible frames of the leader portion of the film 21 which is subjected to blind exposure. Due to the blind exposure indication, it is possible to test the operation of the shutter and film advancing mechanisms after the assembly of the lens-fitted film package.

With the self-cocking mechanism described above, although the film is wound by a very simple mechanism in that the film advancing knob 60 is directly connected with the spool 28 of the film patrone 20, the film advancing knob 60 and the driven sprocket wheel 65 are prevented from being further rotated by a single member, namely the ratchet lever 62, every time the film 21 is wound by one frame. Therefore, the lens-fitted film package can have a reliable one-frame film advancing mechanism while having a simple shutter mechanism.

Figure 12:
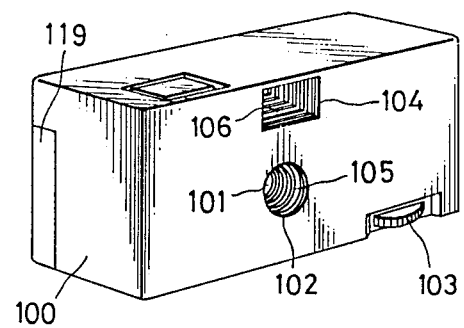
FIG. 12 is a front perspective view of the lens-fitted photographic film package of a fourth embodiment of the present invention.
Figure 14:
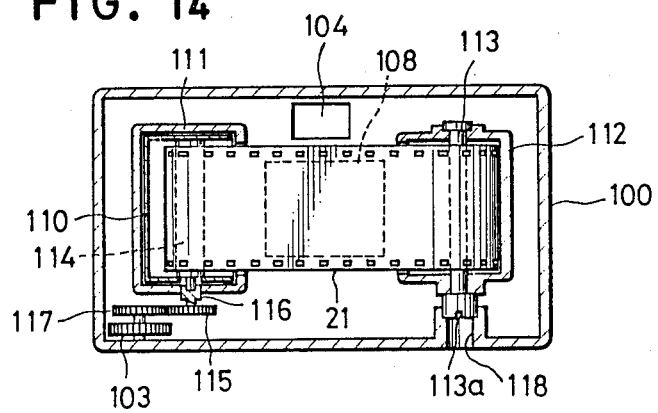
FIG. 14 is an elevational sectional view of the lens-fitted photographic film package of FIG. 12 viewed from the rear.

FIGS. 12 and 14 show still another preferred embodiment of the lens-fitted film package according to the present invention. In this embodiment, a film advancing knob 103 is provided at the bottom of a front wall of a main body section 100 which is formed with an opening 102 for receiving a taking lens 101 therein. Behind the lens opening 102 and a viewfinder window 104 are bores 105 and 106 with grooves formed on the inner surface thereof for preventing diffused reflected light from entering through the openings.

Figure 13:
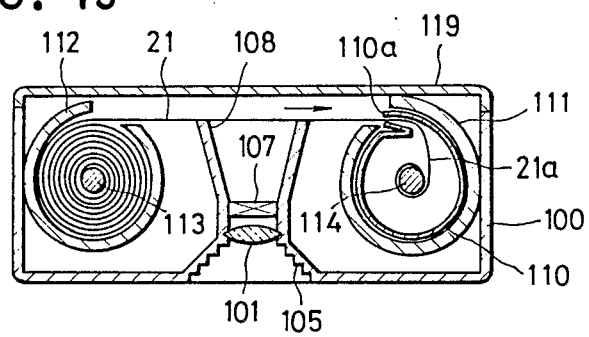
FIG. 13 is a cross sectional view of the lens-fitted photographic film package of FIG. 12.

As is shown in FIG. 13, behind the taking lens 101 is a shutter mechanism 107 supported by an exposure frame 108. On the right hand side of the exposure frame 108 as viewed from the front of the main body section 100 of the film package, there is a film-container-receiving chamber 111 for receiving a light-tight film container 110. On the other hand, on the left hand side of the exposure frame 108, there is a film-receiving chamber 112. In the film-receiving chamber 112 is a spool shaft 113 supported for rotation. The film which is not yet exposed is wound up around the spool shaft 113. The leading end 21a of the film 21 is attached to a spool 114 supported by the film container 110 for rotation. The part of the film 21 between the film-receiving chamber 112 and the film container 110 in the film-container-receiving chamber 111 passes behind the exposure frame 108.

In FIG. 14, showing the main body section 100 as viewed from the rear thereof, the spool 114 of the film container 110 is engaged by a fork 116 projecting partially from the bottom of the film-container-receiving chamber 111. The fork 116 is formed integrally with a shaft of a gear 115 which is rotated with a film advancing knob 103 through an idler gear 117. Upon rotating the film advancing knob 103, the film 21 is wound around the spool 114. The spool shaft 113 disposed in the film-receiving chamber 112 projects outside the film-receiving chamber 112 but is spaced from the bottom of the main body section 100.

At the bottom of the spool shaft 113 is formed a groove 113a which can be engaged by the tip of a screw driver in order to be rotated to wind the film 21 therearound. The groove 113a may have a particular shape suitable for a special tool rather than usual screw drivers in order to prevent the winding or rewinding of the film 21 by users.

According to the above-described construction, the lens-fitted film package is assembled in the following way. At first the film container 110 with the leading portion of the film 21 withdrawn and the trailing end fixed to the spool 114 is loaded in the film-container-receiving chamber 111 of the main body section 100. After fixing the end of the leading portion of the film 21 to the spool shaft 113 of the film-receiving chamber 112, the back cover section 119 is fixed to the main body section 100 so as to form a light-tight rectangular box-shaped film package. Then a screw driver, for example, is inserted through an opening formed in the bottom wall of the main body section 100 to engage with the groove 113a of the spool shaft 113, thereby turning the spool shaft 113 in the counterclockwise direction as viewed in FIG. 13 in order to wind up the film 21 around the spool 113 in the film-receiving chamber 112. This film winding operation can be performed in daylight because the film package is maintained light-tight.

In using the lens-fitted film package thus comprised, after operating the shutter actuating member 120 to make an exposure, the film advancing knob 103 is rotated. As a result, as the spool 114 of the film container 110 is rotated in the clockwise direction as viewed in FIG. 13, the exposed film 21 is wound back into the light-tight film container 110. Therefore, when the exposure of all frames of the film 21 has been completed, the film is fully contained in the light-tight film container 110. Consequently, the film container 110 can be removed by breaking or disassembling the film package even in daylight.

It is to be understood that, although a 35mm-size patrone which is now commercially available is used in this embodiment, the light-tight film containers themselves may take various forms. For instance, a light-tight film container having a film slot may be formed integrally with the main body section 100 but may be adapted to be separated therefrom. Furthermore, it is not always necessary to provide the light-tight film container with a spool. In the case of providing no spool, the exposed film may be thrust into the light-tight film container with the aid of a sprocket wheel well known per se in the art which is caused to rotate by a film-advancing knob.

Figure 2:
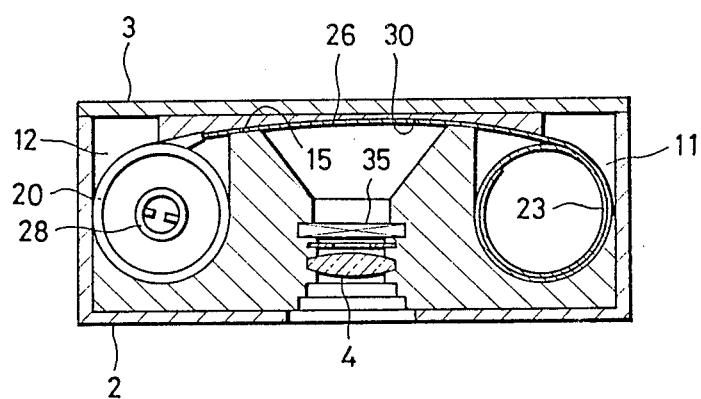
FIG. 2 is a cross sectional view of the lens-fitted photographic film package of FIG. 1.
Figure 15:
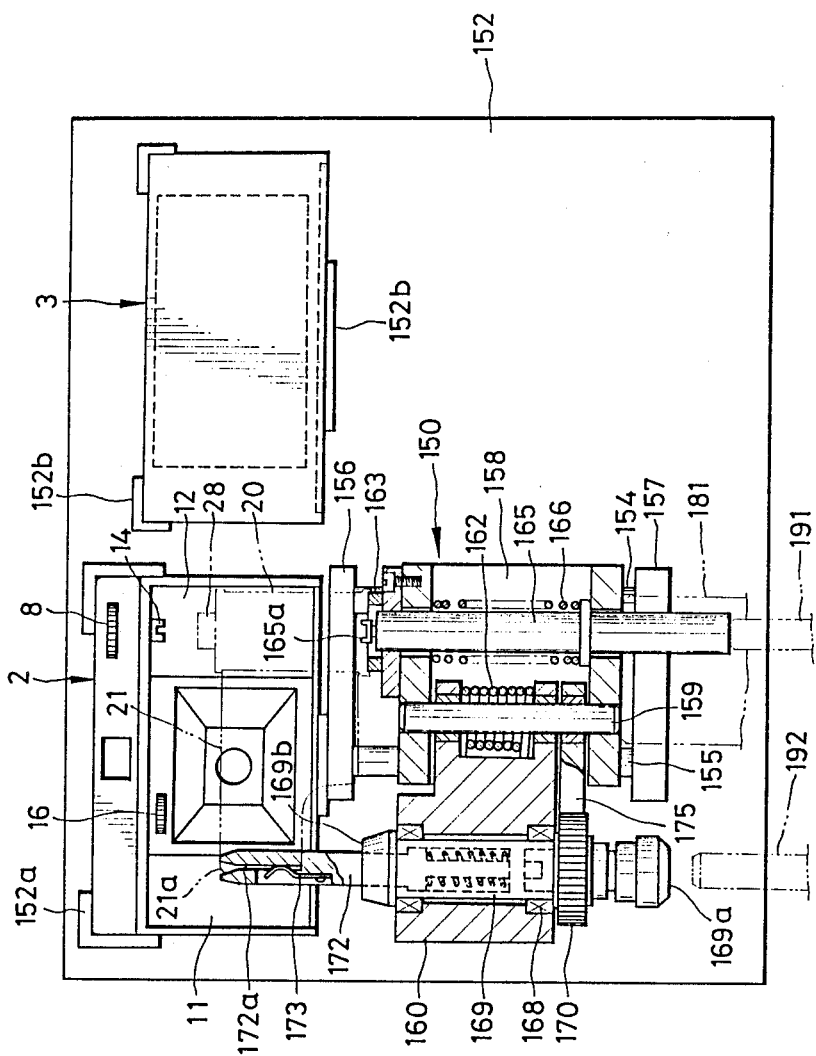
FIG. 15 is a plan view of a film loading device used for assembling the lens-fitted photographic film package of FIG. 1.
Figure 16:
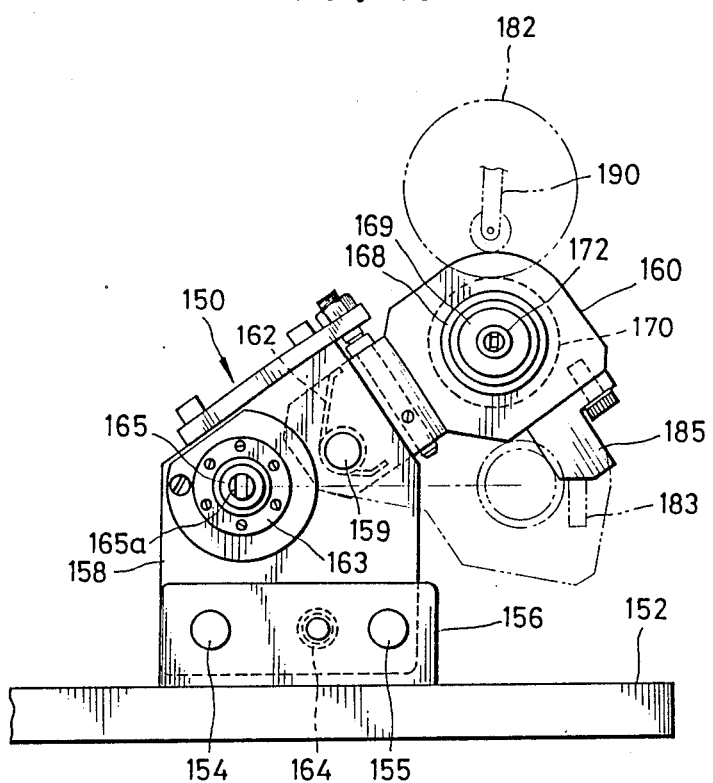
FIG. 16 is a front view of the film loading device of FIG. 15.
Figure 17:
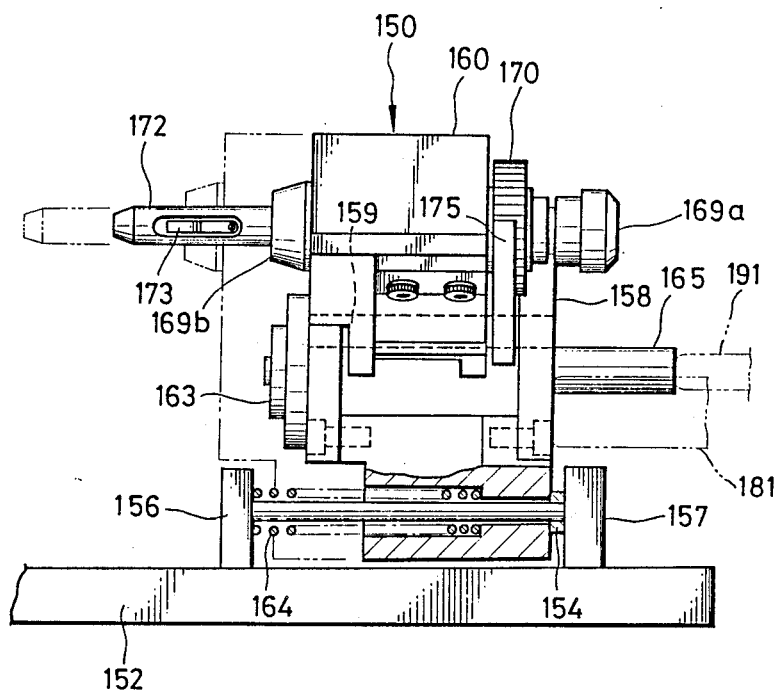
FIG. 17 is a side elevational view of the film loading device of FIG. 15.

Reference is now had to FIGS. 15 to 17 showing, by way of example, a film loading apparatus for automatically loading a film roll and a film patrone into the main body section of the lens-fitted film package shown in FIGS. 1 to 3. The film loading apparatus 150 is mounted on a base plate 152 which will be described in detail later. On the base plate 152 are frames 152a and 152b as is clearly seen in FIG. 18, by which the main body section 2 and the back cover section 3 are adjusted in position.

The film loading apparatus 150 is provided with pedestals 156 and 157 supporting guide rods 154 and 155, a frame member 158 mounted on the guide rods 154 and 155 for sliding movement, and a swingable arm 160 supported on a shaft 159 fixed to the movable frame 158 for vertical swinging movement. Between the swingable arm 160 and the movable frame 158 is a coil spring 162 to urge the arm 160 to pivot in the counterclockwise direction and to press it ordinarily upwardly as viewed in FIG. 16.

The movable frame 158 is ordinarily held in its preparatory position far from the main body section 2 by the coil spring 162 as is shown in FIGS. 14 and 16. As is shown in FIG. 15, the movable frame 158 is provided with an annular magnet 163 fixed to one end of frame 158 by means of set screws. This magnet 163 can attract an end surface of the film patrone 20 and thereby hold the film patrone 20 as is shown in FIG. 15. The movable frame 158 is further provided with an ejecting rod 165 which is movable axially and urged by a coil spring 166 to retract downwardly as viewed in FIG. 15. At the foremost end of the ejecting rod 165, there is a rotatable fork 165a engageable with the spool 28 of the film patrone 20.

An air cylinder 169 with a gear 170 attached to its rear end is rotatably supported by the swingable arm 160 through a bearing 168. By the gear 170, which is prevented from moving axially, the cylinder 169 is rotated to drive a spool 172 which is urged by a spring incorporated in the cylinder 169 to protrude forwardly. When air is released from the air cylinder 169, the spool 172 is retracted from a position shown in FIG. 15 to position its forward end below the bottom surface of the main body section 2. When the air cylinder 169 rotates, the spool 172 and cylinder 169 are rotated.

When the swingable arm 160 moves to a position shown by a double dotted line in FIG. 16, the distance between the center lines of the spool 172 and the ejecting rod 165 is equal to the distance between the center lines of the film patrone receiving chamber 12 and the film roll receiving chamber 11. At the tip of the spool 172, the spool is formed with a slot 172a in which the leading portion 21a of the film 21 is held by means of a leaf spring 173. If the leading portion 21a of the film 21 is tightly wound around the spool 172 while holding it in the slot 172a, the film will be sharply curled. For preventing such a sharp curl, it is desirable to cut off or round any sharp edges of the spool 172 adjacent to the slot 172a as is shown in FIGS. 20(A) and (B).

The shaft 159 which serves as a pivot for the swingable arm 160 is provided with a ratchet 175 in engagement with the teeth of the gear 170 so as to prevent the gear 175 from being rotated in the counterclockwise direction.

The film loading apparatus thus constructed is installed along an automatic assembly line as shown in FIGS. 19 and 20. FIG. 19 illustrates schematically the automatic assembly line and FIG. 20 shows the relative position of the base plate 152 and a loading station 177.

A plurality of the base plates 152, on each of which the film loading apparatus 150 and the frames 152a and 152b are carried, and which in turn are carried as a unit by a conveyor belt 178, are advanced by the conveyor belt 178 stepwise to the right as viewed in FIG. 19 and pass through a darkroom 180. Along the path of the conveyor belt 178, there are provided a unit supplying station, a patrone supplying station 177, the dark room 180, and a pick-up station. In the dark room 180 are carried out the steps of making a film roll 23 by withdrawing unexposed film 21 from the film patrone 20 without exposing it to light, engaging the spool 28 of the film patrone 20 with the fork 14 by inserting the patrone axially into the film-patrone-receiving chamber 12 of the main body section 2, inserting the rolled film 23 into the film roll receiving chamber 11, removing the spool 172 from the film roll 23, and securing the back cover section 3 to the main body section 2.

In the unit supplying station, the main body section 2 and the back cover section 3 are manually supplied to the base plate 152. In the patrone supplying station, a film patrone 20 with only a film leader withdrawn therefrom is placed in the film patrone receiving chamber 12 of the main body section 2. When the conveyor 178 carries the base plate 152 to the patrone supplying station 177, an arm 181 (see FIGS. 15 and 17) protrudes by a predetermined distance to push the movable frame 158 forwardly against the coil spring 162. As a result of the forward movement of the movable frame 158, the magnet 163 attracts the film patrone 20 in the film-patrone-receiving chamber 12.

After the attraction of the film patrone 20, the arm 181 is returned to its initial position while returning the movable frame 158 to the preparation position shown in FIG. 15 so as to withdraw the film patrone 20 partially from the film-patrone-receiving chamber 12. At this time, the fork 165a of the ejection rod 165 is brought into resilient engagement with the spool 28 of the film patrone 20 by the spring 166. When the spool 28 is slightly turned in the next station, it is ensured that the fork and spool engage with each other. For this engagement, the spool 28 of the film patrone 20 is given a back-tension through the fork 165a when the unexposed film 21 is withdrawn from the film patrone 20.

Upon the movable frame returning to the preparation position shown in FIG. 16, a driving gear 182 in the patrone supplying station 177 descends to mesh with the gear 170 of the air cylinder 169. Simultaneously, the supporting member 183 extends below a receiving portion 185 attached to the bottom of the swingable arm 160, preventing the rotatable arm 160 from descending when the driving gear 182 meshes with the gear 170. After the driving gear 182 has been adjustably turned to bring the slot 172a of the spool 172 to its predetermined position, the driving gear 182 and the supporting member 183 are returned. Then the film leader 21a that protrudes from the film patrone 20 is manually inserted into the slot 172a of the spool 172 and held by the leaf spring 173, and is thereby prevented from escaping.

The converter 178 brings the film loading apparatus 150 on the base plate 152 to the darkroom 180. Therein the film loading device 150 is operated at a rewinding station 187 which is also provided with a driving gear and a supporting member, similar to the gear 182 and the supporting member 183, engageable with the gear 170 of the air cylinder 169. The driving gear drives the gear 170 to turn in the clockwise direction viewed in FIG. 16. As the gear 170 turns, the spool 172 is rotated to withdraw the film 21 from the film patrone 20 and wind it therearound. Since the film 21 is given a slight back-tension through the fork 165a, the spool 172 can wind the film 21 tightly therearound. The driving gear 182 is driven by a motor (not shown) disposed in the rewinding station 187. Between the motor and the gear 182, there is provided a slipping mechanism so as to import to the driving gear 182 a constant torque. For the purpose of preventing the film patrone 20 from being detached from the magnet during the winding of the film 21 around the spool 172, the film patrone 20 is desirably supported in any well-known manner.

When a sufficient time has elapsed after the spool 172 has started to rotate, the driven gear 182 automatically stops. Because the length of the film previously contained in the film patrone 20 is known, said sufficient time is previously set according to the length of film to ensure that the film 21 will be fully withdrawn from the film patrone 20 at the time the spool 172 stops. In this way, the film roll 23 is formed. As the film 21 is above the main body section 2 during the winding thereof, the film 21 is protected from getting scratches on the surfaces thereof. Moreover, the film can be wound at a high speed. It may be preferable to detect the load exerted on the spool shaft 172 by means of the slipping mechanism, so as to stop the driving gear 182 when a load above a predetermined load is detected.

After the film roll 23 has been formed and the spool shaft 172 stops, the driving gear 182 and the supporting member 183 are returned to their initial positions. Then the base plate 152 moves to the next operating station, namely a film installing station 188. During this movement, as the gear 170 is prevented from counterclockwise rotation by the ratchet 175, the film roll 23 does not loosen due to the resiliency of the film 21 itself.

At the film installing station 188, there are an arm similar to the arm 181 of the film loading stage 177, a push-down rod 190 with a roller attached to its end for pushing down the swingable arm 160 in the manner shown in FIG. 16, and a stopping rod 191 which is in contact with the gear end of the ejecting rod 165 supported by the movable frame 158 and prevents the ejecting rod 165 from returning when the movable frame 158 moves rearwardly in the same manner as is shown in FIGS. 14 and 16 so as to push out the ejecting rod 165 relative to the frame 158. At the film installing station 188, there is an air nozzle 192 which projects and is brought into connection with a nozzle coupler 169a at the end of the air cylinder 169 when the swingable arm 160 swings down to a position shown by double dotted lines in FIG. 16.

When the film loading device 150 is moved to the film installing station 188 from the film winding station 187, the arm 181 is pushed out to move the movable frame 158 to the loading position shown by double dotted lines in FIG. 17 from the preparation position shown in FIG. 15, so as to insert the film patrone 20 attracted by the magnet 163 into the film-patrone-receiving chamber 12 of the main body section 2. In this way, the spool 28 of the film patrone 20 is smoothly brought into engagement with the fork 14 of the main body section 2.

At this time, as the swingable arm 160 is in its lifted position, the film roll 23 wound around the spool shaft 172 is still disposed above the film-roll-receiving chamber 11. When the arm 181 is extended a predetermined distance, the movable frame 158 moves to the loading position, and the push-down rod 190 is caused to descend by means of, for example, a motor or an air cylinder so as to swing the swingable arm 160 about the shaft 159 against the force of the spring 162.

When the swingable arm 160 reaches a position shown by double dotted lines in FIG. 16 to align horizontally the spool shaft 172 with the ejecting rod 165, and hence the film roll 23 with the film patrone 20, the film roll 23 is inserted into the film-roll-receiving chamber 11 from above. In this way, the film 21 is engaged with the sprocket 16 projecting from the film supporting surface of the exposure frame 15 from above, so as to avoid being caught by the sprocket. The angle through which the swingable arm 160 turns is set to be about 35 degrees.

When the push-down rod 190 descends a predetermined distance to insert the film roll 23 into the film-roll-receiving chamber 11, the air nozzle 192 (see FIG. 15) of the film installation station 188 is extended to connect with the nozzle coupler 169a of the air cylinder 169. By sucking air from the air cylinder 169, the spool shaft 172 is gradually retracted. As the film roll 23 is retained by the front edge 169b of the air cylinder 169 during the retraction of the spool shaft 172, the spool shaft 172 slips out of the film roll 23 so as to allow it to fall into the film-roll-receiving chamber 11.

After the spool shaft 172 has returned, the stopping rod 191 is caused to move so as to contact to the rear end of the ejecting rod 165. At this time, the arm 181 is retracted and the movable frame 158 is moved to the preparation position by the coil spring 164. As the result of the movement of the movable frame 158, the film patrone 20 is pushed out by the ejecting rod 165 and disconnected from the magnet 163 to be left in the film patrone receiving chamber 12.

When the movable frame 158 returns after the film patrone 20 and the film roll 23 have been received in the respective receiving chambers 11 and 12, in the manner described above, the moved elements such as the push-down rod 190, stopping rod 191, air nozzle 192, swingable arm 160, and the spool shaft 172 return to their initial positions to complete the film installing operation. The base plate 152 is then moved to the next station, namely the back cover fitting station 195 in the darkroom 180. Therein a manipulator is provided to place the back cover section 3, which is located on the base plate 152, on the main body section 2 to form a light-tight box-shaped film package. The main body section 2 fitted with the back cover section 3 is then moved to the welding station 196 to be subjected to an ultrasonic welding. In this way, the film package is completely assembled into one body, to provide a light-tight lens-fitted film package including the film patrone 20 and the film roll 23 therein. However, it is preferable that a part 3a of the bottom of the back cover section 3 is left unwelded in order to make it easy to break open the back cover 3 when the film patrone is removed. The completed lens-fitted film package on the base plate 152 is transferred by the conveyor out of the darkroom 180 to the next station, namely the pick-up station, in the daylight again, wherein the completed lens-fitted film package is picked up and subjected to inspection.

After the pick-up station, the base plate 152 whose movable frame 158 is restored to its preparation position shown in FIG. 15 and whose swingable arm 160 returns to its lifted position shown by a solid line in FIG. 16 is returned to the unit supplying station to load another unit.

Although, in the above-described embodiment, the patrone supplying station is provided in order to supply the film patrone 20 to the film patrone receiving chamber 12 of the main body section 2, the loading station 177 can be omitted by holding directly the film patrone by the magnet at the patrone supplying station. In this case, the adjustment of the initial position of the spool shaft 172 is, for example, performed at the end of the operation in the film installing station, while the leader portion of the film extending from the film patrone 20 is inserted into the slot 172a of the spool shaft 172.

Figure 21:
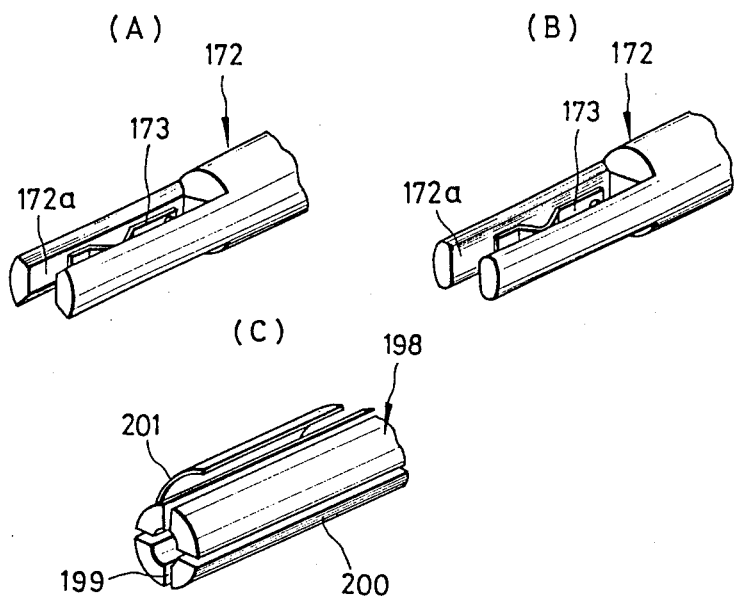
FIGS. 21 (A), (B) and (C) are perspective views showing various spool shafts for use with the film loading device of FIG. 15.

In order to prevent the leader portion of the film 21 from getting an impression or mark on the slot 172a thereon when winding the film 21 around the spool shaft 172, it is desirable to use a spool shaft 198 shown in FIG. 21(C). The spool shaft 198 comprises a slotted shaft 200 with an attached retaining spring member 201. Between the slotted spool shaft 200 and the retaining spring member 201, the leader portion of the film 21 is grasped. Therefore, if the spool shaft 200 is rotated in the counterclockwise direction, the film can be wound around the spool shaft 200 and then can slip off in an axial direction. When slipping off the rolled film the spool shaft 200 is deformed.

Figure 22:
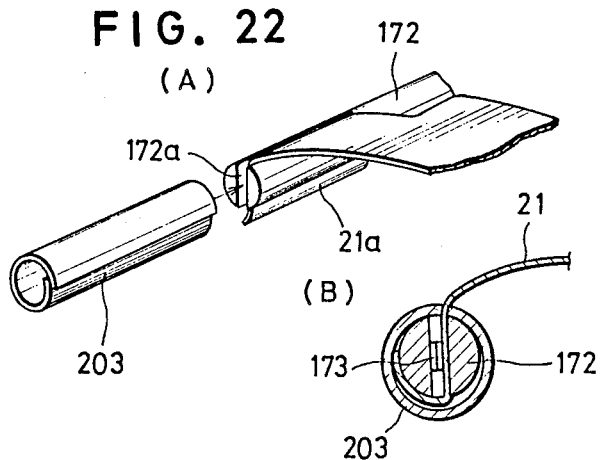
FIGS. 22 (A) and (B) are exploded perspective and cross-sectional views, respectively, showing a spool shaft with a sleeve for use with the film loading device of FIG. 15.

As shown in FIG. 22(A), it is also desirable to use the slotted spool shaft 172 fitted with a resilient sleeve 203. In this case, after inserting the film leader portion 21a into the slot 172a and holding it by the leaf spring 173, the sleeve 203 is expanded and fitted over the spool shaft 172. When removing the spool shaft 172 from the film 23 rolled therearound, the rolled film 23 is left with the sleeve 203 in the film roll receiving chamber 11. The sleeve 203 left in the film roll receiving chamber 11 can serve as a spool for the film roll 23.

Although the present invention has been fully described by way of the preferred embodiments thereof with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A lens-fitted photographic film package having an externally operable member for effecting an exposure, comprising:
    a light-tight film casing which must be destroyed to open the same, having an opening through which said exposure is made when said externally operable member is operated;
    an unexposed rolled film disposed on one side of said opening in said light-tight casing;
    a removable light-tight film container having a film winding spool therein disposed on the opposite side of said opening in said light-tight casing from said rolled film, one end of said rolled film being attached to said film winding spool;
    means for winding said rolled film into said light-tight film container and around said film winding spool; and
    winding control means responsive to operation of said externally operable member for allowing said film winding spool to rotate so as to enable said rolled film to be advanced by only one frame after every exposure; said winding control means including:
    a sprocket wheel driven by movement of said rolled film; and
    a frame counter driven by said sprocket wheel, said frame counter being provided with indications designating a series of frame numbers and means for disabling said winding control means responsive to said frame counter indicating there remains on said unexposed film no film frame capable of being exposed.

2. A lens-fitted photographic film package as claimed in claim 1, said means for disabling said winding control means being a projections formed integrally with said frame counter on an under surface thereof.

3. A lens-fitted photographic film package as claimed in claim 2, said winding means being a wheel having teeth on its peripheral surface, said wheel being in driving relation with said winding spool of said film container.

4. A lens-fitted photographic film package as claimed in claim 3, said winding control means being a rotary member having a first portion in engagement with the teeth of said winding wheel and a second portion pressed against a cam means on a sprocket shaft, said rotary member being biased into contact with said cam means, said cam means having a recess into which said second portion can be inserted, and when said second portion is in said recess, said first portion being engaged with the teeth of said winding wheel to stop said winding wheel.

5. A lens-fitted photographic film package as claimed in claim 4, further including means causing said winding means to move in opposite direction from the biased direction of said rotary member upon actuating a shutter of a taking lens of the film package, thereby to enable winding operation.

6. A lens-fitted photographic film package as claimed in claim 5, wherein said projection is disposed in the path of movement of said rotary member when there is no film frame capable of being exposed, so that said projection prevents said first portion from engaging with the teeth on the peripheral surface of said winding wheel.

7. A lens-fitted photographic film package comprising:
    a light-tight film casing which must be destroyed to open the same, having an opening through which an exposure is made;
    a light-tight film container having a film winding spool therein disposed on one side of said opening in said light-tight film casing;
    a rotatable spool disposed on the opposite side of said opening in said light-tight film casing from said light-tight film container; one end of said spool being exposed outside said light-tight film casing;
    a film roll of exposed film of which one end is attached to said film winding spool in said light-tight film container and which is rolled around said rotatable spool.

8. A lens-fitted photographic film package comprising a light-tight film casing which must be destroyed to open the same, and a rolled film contained in said light-tight film package, said light-tight film package comprising:
    a front casing section provided with a lens opening, a finder frame opening, and engaging openings;
    a middle casing section with its back open and containing said rolled film therein, said middle casing section having engaging lugs which engage with said engaging openings of said front casing section and holding a lens behind said lens opening between said front and middle casing sections; and
    a rear casing section light-tightly closing said back of said middle casing section.

9. A lens-fitted photographic film package comprising:
    a light-tight film casing which must be destroyed to open the same, having an opening through which an exposure is made;
    a light-tight film container having a film winding spool therein disposed on one side of said opening in said light-tight film casing;
    a resilient sleeve disposed on the opposite side of said opening in said light-tight film casing from said light-tight film container; and
    a roll of unexposed film of which one end is attached to said film winding spool in said light-tight film container and which is rolled around said resilient sleeve;
    said resilient sleeve being split lengthwise the full length thereof, the other end of said roll of unexposed film being disposed within said sleeve and passing between edges of said resilient split sleeve.

10. A lens-fitted photographic film package as defined in claim 7, wherein said exposed end of said spool has a recess therein of a shape to receive a tool to rotate said rotatable spool.

11. A lens-fitted photographic film package having an externally operable member for effecting an exposure, comprising:
- a light-tight casing which must be destroyed to open the same, having an opening through which said exposure is made when said externally operable member is operated;
- an unexposed rolled film disposed on one side of said opening in said light-tight casing;
- a removable light-tight film container having a film winding spool therein disposed on the opposite side of said opening in said light-tight casing from said rolled film, one end of said rolled film being attached to said film winding spool;
- means for winding said rolled film into said light-tight film container and around said film winding spool;
- said light-tight casing comprising a main body section which is provided with a shutter member, and a back cover section, these two sections being assembled into one integral unit; and
- supporting means consisting of a single resilient member attached to said back cover section, said single resilient member embracing and removably holding said light-tight film container and embracing said rolled film.

12. A lens-fitted photographic film package as claimed in claim 11, wherein said resilient member terminates in arms that contact only the ends of said light-tight film container and said rolled film.

13. A lens-fitted photographic film package having an externally operable member for effecting an exposure, comprising:
- a light-tight casing which must be destroyed to open the same, having an opening through which said exposure is made when said externally operable member is operated;
- an unexposed rolled film disposed on one side of said opening in said light-tight casing;
- a removable light-tight film container having a film winding spool therein disposed on the opposite side of said opening in said light-tight casing from said rolled film, one end of said rolled film being attached to said film winding spool;
- means for winding said rolled film into said light-tight film container and around said film winding spool;
- said light-tight casing comprising a main body section which is provided with a shutter member, and a back cover section, these two sections being assembled into one integral unit; and
- supporting means comprising flexible portions integrally formed of one piece with and extending from said main body section, said flexible portions embracing and removably holding said light-tight film container and embracing said rolled film.

14. A lens-fitted photographic film package as defined in claim 13, wherein the portion of said supporting means which embraces said rolled film has grooves therein facing said rolled film and extending perpendicular to the direction of movement of said rolled film.

15. A lens-fitted photographic film package comprising:
- a light-tight film casing, having an opening through which an exposure is made;
- a light-tight film container having a film winding spool therein disposed on one side of said opening in said light-tight film casing;
- a rotatable spool disposed on the opposite side of said opening in said light-tight film casing from said light-tight film container; one end of said spool being exposed outside said light-tight film casing;
- a film roll of unexposed film of which one end is attached to said film winding spool in said light-tight film container and which is rolled around said rotatable spool.

* * * * *

UNITED STATES PATENT AND TRADEMARK OFFICE
CERTIFICATE OF CORRECTION

PATENT NO. : 4,884,087
DATED : November 28, 1989
INVENTOR(S) : Mitsuyoshi MOCHIDA et al.

It is certified that error appears in the above—identified patent and that said Letters Patent is hereby corrected as shown below:

Column 17, Claim 2, line 51, change "projections" to --projection--.

Column 18, Claim 7, line 26, change "a film roll of exposed film" to --a film roll of unexposed film--.

Signed and Sealed this

Twenty-fifth Day of June, 1991

Attest:

HARRY F. MANBECK, JR.

Attesting Officer

Commissioner of Patents and Trademarks